United States Patent
Rajabali et al.

(10) Patent No.: US 10,556,664 B2
(45) Date of Patent: Feb. 11, 2020

(54) METHOD FOR MANUFACTURING A PANEL WITH A DOUBLER

(71) Applicant: Fokker Aerostructures B.V., Papendrecht (NL)

(72) Inventors: Abdoel Faziel Rajabali, Alphen aan de Rijn (NL); Pim Tamis, Houten (NL)

(73) Assignee: FOKKER AEROSTRUCTURES B.V., Papendrecht (NL)

( * ) Notice: Subject to any disclaimer, the term of this patent is extended or adjusted under 35 U.S.C. 154(b) by 42 days.

(21) Appl. No.: 15/633,926

(22) Filed: Jun. 27, 2017

(65) Prior Publication Data

US 2017/0369145 A1 Dec. 28, 2017

(30) Foreign Application Priority Data

Jun. 28, 2016 (NL) ..................................... 2017062

(51) Int. Cl.
- *B64C 1/12* (2006.01)
- *B32B 7/12* (2006.01)
- *B32B 15/04* (2006.01)
- *B32B 15/20* (2006.01)
- *B32B 37/00* (2006.01)
- *B32B 37/12* (2006.01)
- *B32B 38/00* (2006.01)

(52) U.S. Cl.
CPC .................. *B64C 1/12* (2013.01); *B32B 7/12* (2013.01); *B32B 15/043* (2013.01); *B32B 15/20* (2013.01); *B32B 37/003* (2013.01); *B32B 37/12* (2013.01); *B32B 38/0036* (2013.01); *B32B 2262/101* (2013.01); *B32B 2305/08* (2013.01); *B32B 2311/24* (2013.01); *B32B 2605/18* (2013.01)

(58) Field of Classification Search
CPC ........................................................ B64C 1/12
USPC ............................................................ 428/77
See application file for complete search history.

(56) References Cited

FOREIGN PATENT DOCUMENTS

| WO | WO-02094565 A1 * | 11/2002 | ............ B29C 53/04 |
| WO | 02/094565 A1 | 11/2012 | |

OTHER PUBLICATIONS

Van Der Jagt et al., "Fibre Metal Laminates, an Introduction", edited by Ad. Vlot et al., Kluwer 2001, pp. 267-280, Chapter 17: "Detailed design concepts".

\* cited by examiner

*Primary Examiner* — Brent T O'Hern
(74) *Attorney, Agent, or Firm* — Young & Thompson

(57) ABSTRACT

Disclosed is a panel for an aircraft structure, including a laminated skin of layers of metal of which in each case two are joined together by a fibre-reinforced adhesive layer, as well as a laminated doubler of layers of metal and at least one fibre-reinforced adhesive layer in each case between two layers of metal, wherein the doubler has a smaller size of perimeter than the skin and is bonded to an outermost layer of metal of the laminated skin by a fibre-reinforced supplementary adhesive layer, with the feature that at least one part of the perimeter of the fibre-reinforced supplementary adhesive layer is staggered inwards relative to the corresponding perimeter of the doubler and that that part of the inwards-staggered perimeter of the fibre-reinforced supplementary adhesive layer is delimited by a glued edge. Also disclosed is a method for manufacturing such a panel.

14 Claims, 6 Drawing Sheets

METHOD FOR MANUFACTURING A PANEL WITH A DOUBLER

FIELD OF THE INVENTION

The invention relates to a method for manufacturing a panel for an aircraft structure, said panel being provided with a doubler, wherein the method comprises supplying the doubler in the form of a laminate of layers of metal and at least one fibre-reinforced adhesive layer in each case between two layers of metal, the at least two layers of metal being fastened together by means of said at least one fibre-reinforced adhesive layer.

DESCRIPTION OF THE RELATED ART

Such a method is known from the book: "Fibre Metal Laminates, an Introduction", edited by Ad Vlot et al., Kluwer 2001, pages 267-280, Chapter 17: "Detailed design concepts" by O. C. van der Jagt et al. This method describes the use of a doubler or thickening as a local reinforcing element. The doubler is placed on a laminated skin with a precursor of an adhesive layer between the doubler and the laminated skin, after which the laminated skin together with the doubler is put in an autoclave to activate the adhesive layer by means of increased pressure and temperature.

This manner of manufacturing two laminates on one other is also described in WO-02/094565-A1. This document describes how at least two laminates each with different contour, are bonded to each other by means of an adhesive layer between each of the laminates that is to be activated. This activation takes place at increased temperature and pressure.

Panels for an aircraft structure comprise Fibre Metal Laminates (FML)—laminates which, as sandwich components of unidirectional glass-fibre prepregs, adhesive materials and thin metal plates, for example aluminium plates, are assembled together by stacking on a jig. A glass-fibre prepreg is a glass-fibre mat that is embedded in a matrix material. The metal plates with at least one fibre-reinforced adhesive layer in each case between two layers of metal are placed on top of each other on a jig. After the stacking process, the jig with the product is put in an autoclave. Then the product in the autoclave is glued together and cured under high pressure and high temperature. This results in a laminated product with a smooth jig side, which also forms the outside of the aircraft, the so-called laminated skin.

For certain purposes it is desirable to reinforce the laminated skin, for example as local reinforcement at a door or window opening. Such reinforcement is obtained by local attachment of a further laminate on the surface of the laminated skin. The laminated skin is then thickened in the location of the attached further laminate. The further laminate is also called a doubler or thickening.

A disadvantage of the method described above is that both the laminated skin and the doubler undergo a first activation step, for example in an autoclave, to form a laminate. After placement of the doubler on the laminated skin, with a precursor of an adhesive layer between them, this assembly undergoes an activation step again, for example in the same autoclave. Such a method is time-consuming because the same process steps must take place three times before the panel being manufactured is ready. Furthermore, this method has an adverse effect on the production capacity of the equipment used, such as the jig that is used.

SUMMARY OF THE INVENTION

The aim of the invention is to provide a method that does not have the aforementioned disadvantages. For this purpose, this method comprises the following steps:
  supplying the doubler in the form of a laminate of layers of metal and at least one fibre-reinforced adhesive layer in each case between two layers of metal, the at least two layers of metal being fastened together by means of said at least one fibre-reinforced adhesive layer,
  supplying a jig,
  supplying, in the jig, a stack of layers of metal and layers of fibres embedded in a precursor of an adhesive placed in each case between two layers of metal, for forming a skin,
  placing a further layer of fibres embedded in a precursor of an adhesive on the stack,
  placing the doubler on the further layer of fibres embedded in a precursor of an adhesive, so that the further layer of fibres embedded in a precursor of an adhesive forms an intermediate layer between the stack and the doubler,
  placing an air-tight covering layer on top of the stack, the intermediate layer and the doubler, thereby forming a space between the jig and the covering layer,
  air-tight closure of the covering layer around the perimeter of the stack, the intermediate layer and the doubler with respect to the jig,
  placing the jig with the stack, the intermediate layer and the doubler as well as the sealed covering layer in an autoclave,
  lowering the pressure in the space between the jig and the covering layer,
  under the effect of heat and pressure in the autoclave, gluing the layers of metal together by activating the precursor of the adhesive of each embedded layer of fibres, with formation of a laminated skin, as well as simultaneous activation, under the effect of the heat and pressure in the autoclave, of the precursor of the adhesive of the further layer of fibres in the intermediate layer with formation of a supplementary adhesive layer, by means of which the doubler is bonded to the laminated skin, thereby forming the panel,
  removing the panel from the autoclave.

The method according to the invention has the advantage that the step of laminating the skin takes place at the same time as bonding the doubler to the laminated skin. Because these process steps are carried out at the same time, the production time is reduced. Furthermore, this method has the advantage that the occupancy time of the jigs per panel is shorter. This logistic advantage follows because the jigs are now only required for assembling the panel, instead of for assembling both the laminated skin and the panel.

The laminate of layers of metal and at least one fibre-reinforced adhesive layer in each case between two layers of metal that forms the doubler is manufactured beforehand by means of a known process for an autoclaved laminate—the stack is cured in the form of a laminate, or by a process described below. The doubler is applied on a stack of layers of metal with, in each case between two layers of metal, layers of fibres embedded in a precursor of an adhesive. An intermediate layer of a further layer of fibres embedded in a precursor of an adhesive is provided between the stack and the doubler. After laminating, the stack forms the laminated skin to which the doubler with the intermediate layer is bonded.

The whole of the stack, the intermediate layer and the doubler is formed in a jig and is covered air-tight with an air-tight coating, so that a space forms between the jig and the air-tight coating. The pressure in this space is lowered relative to the ambient pressure. The whole of the jig, the stack, the intermediate layer, the doubler and the air-tight coating is subjected to heat and pressure, preferably in an autoclave. During this, a laminated skin of the stack is formed by activating the precursor of the adhesive of each embedded layer of fibres between the layers of metal. Furthermore, simultaneously, the precursor of the adhesive of the further layer of fibres in the intermediate layer is activated, whereby a supplementary adhesive layer is formed, by means of which the doubler is bonded to the laminated skin.

After laminating the stack and bonding the doubler to the skin, the panel is formed. The panel is removed from the autoclave, so that it can cool down and be processed further.

The aforementioned method may further comprise the steps of:
 causing the perimeter of the further layer of fibres to recede relative to the perimeter of the doubler,
 filling the space delimited by the doubler, the stack and the perimeter of the further layer of fibres with glue, forming a glued edge,
 activating the glued edge under the effect of heat in the autoclave.

The further layer of fibres may have smaller dimensions than the doubler, so that the perimeter of the further layer of fibres is set back relative to the perimeter of the doubler. In other words: the perimeter of the doubler extends beyond the perimeter of the further layer of fibres. A space is now formed between the doubler, the stack and the perimeter of the further layer of fibres. This space is filled with glue, finally giving good bonding of the doubler with the laminated skin to the perimeter. This bonding is activated in the autoclave, simultaneously with forming the panel.

The advantage of using glue in the space between the doubler, the stack and the perimeter of the further layer of fibres is that this prevents the doubler becoming detached from the laminated skin at the perimeter. This is in contrast to the situation in which the further layer of fibres extends to or beyond the perimeter of the doubler and the adhesive layer that arose between the doubler and the laminated skin after autoclaving may become detached from the laminated skin.

According to an embodiment, the method comprises the step of:
 after removal of the panel from the autoclave, simultaneous material-removal machining from a combined edge part of the laminated skin and the doubler of the panel to provide a predetermined nominal edge shape and dimensioning of the panel.

By simultaneous material-removal machining of a combined edge part of the laminated skin and the doubler after forming the panel, only a single processing step is necessary for such processing, namely finishing the combined edge part to size for example by milling. After this simultaneous machining the edge of the doubler is perfectly aligned with the edge of the laminated skin.

Preferably the method further comprises:
 providing positioning openings in the doubler,
 providing positioning openings in the layers of metal and embedded layers of fibres for forming the skin,
 aligning said positioning openings in the doubler and in the skin in the jig relative to each other,
 fastening positioning pins to the jig that extend through said positioning openings in the doubler and in the skin.

The positioning openings are used for aligning the doubler and the layers forming the stack in the jig. Positioning pins are provided in the jig for this. These positioning pins pass through the positioning openings of the doubler and the layers of the stack. For the layers of the stack, the positioning pins have some clearance with the positioning openings in the layers of the stack, so as to be able to offer the layers of metal in the stack the necessary room to move during autoclaving. The layers of metal may then "settle", wherein the layers of metal may move somewhat laterally relative to the jig and relative to each other.

Preferably the method further comprises:
 manufacturing a doubler and a skin with oversize with formation of a supplementary region into which both the skin and the doubler extend,
 providing the positioning openings through the skin and the doubler of the panel in the location of the supplementary region,
 removing the supplementary region, with formation of an edge of the panel.

The doubler and the stack are prepared oversize in the jig. This oversize creates a supplementary region during forming of the panel. After removal of the panel from the autoclave, this supplementary region can be removed by material-removal machining. When the positioning openings in the doubler and the stack are finally provided in the location of the supplementary region, on removal of the supplementary region these openings are also removed.

The method may further comprise manufacture of the doubler, by:
 supplying a supplementary jig,
 supplying, in the supplementary jig, a supplementary stack of layers of metal and layers of fibres embedded in a precursor of an adhesive included in each case between two layers of metal,
 placing an air-tight covering layer over the supplementary stack, thereby forming a space between the supplementary jig and the covering layer,
 air-tight closure of the covering layer around the perimeter of the supplementary stack relative to the supplementary jig,
 putting the supplementary jig with the supplementary stack in an autoclave,
 lowering the pressure in the space between the supplementary jig and the covering layer,
 under the effect of heat and pressure in the autoclave, gluing the layers of metal together by activating the precursor of the adhesive of each layer of fibres, with formation of a doubler in the form of a laminate from layers of metal and at least one fibre-reinforced adhesive layer in each case between two layers of metal,
 removing the doubler from the autoclave.

The doubler is formed from a prefabricated laminate, wherein the precursor of the adhesive of each layer of fibres is activated and a fibre-reinforced adhesive layer forms in each case between two layers of metal. Because the doubler is already formed as a laminate, when manufacturing the panel, only the laminated skin and the bonding between the laminated skin and the doubler need to be formed.

According to an embodiment of the method, supplying the doubler in the form of a laminate comprises manufacture of the doubler by the steps of:

supplying a supplementary stack of layers of metal and
layers of fibres embedded in a precursor of an adhesive
included in each case between two layers of metal, and
placing the supplementary stack on the intermediate layer,
wherein during the step of gluing the layers of metal together under the effect of heat and pressure by activating the precursor of the adhesive of each layer of fibres, a doubler is formed on the laminated skin in the form of a laminate of layers of metal and at least one fibre-reinforced adhesive layer in each case between two layers of metal.

In this embodiment, the doubler is then formed as a supplementary stack on the intermediate layer that forms on the laminated skin during autoclaving of the doubler. Such a method has the advantage that the doubler no longer needs to be manufactured beforehand and that only one autoclaving step needs to take place in the process.

Preferably each layer of metal of the supplementary stack then has a smaller perimeter than an underlying layer of metal of the supplementary stack. This means that each successive layer of metal has a smaller area. At least one part of the peripheral edge of each successive layer of metal is staggered relative to a peripheral edge of the underlying layer of metal.

According to an embodiment, the method comprises applying a doubler that has a smaller perimeter than the skin. The doubler may have a smaller perimeter locally than the skin, i.e. at least one part of the peripheral edge of the doubler is staggered relative to a peripheral edge of the skin. Such a step has the advantage that the laminated skin may be provided with strengthening locally, for example at the site of a door or window opening or a cargo hatch.

The method may further comprise, before placing an air-tight covering layer over the stack, the intermediate layer and the doubler, the step of placing a further intermediate layer on a free side of the doubler, wherein the further intermediate layer comprises a further layer of fibres embedded in a precursor of an adhesive, and a further doubler on the further intermediate layer.

Such a step may be applied if several doublers are necessary for the desired strengthening, in other words when a single doubler does not provide the desired strengthening.

The invention further relates to a panel for an aircraft structure, manufactured according to the method described above, said panel comprising a laminated skin of layers of metal, in each case two of which are joined together by a fibre-reinforced adhesive layer, as well as a laminated doubler of layers of metal and at least one fibre-reinforced adhesive layer in each case between two layers of metal, wherein said doubler has a smaller size of perimeter than the skin and is bonded to an outermost layer of metal of the laminated skin by a fibre-reinforced supplementary adhesive layer, wherein at least one part of the perimeter of the fibre-reinforced supplementary adhesive layer is staggered inwards relative to the corresponding perimeter of the doubler and wherein that part of the inwards-staggered perimeter of the fibre-reinforced supplementary adhesive layer is delimited by a glued edge.

The fibre-reinforced supplementary adhesive layer has smaller dimensions than the doubler, so that at least one part of the perimeter of the fibre-reinforced supplementary adhesive layer is set back relative to the perimeter of the doubler. In other words: the perimeter of the doubler extends beyond this part of the perimeter of the fibre-reinforced supplementary adhesive layer. The space formed between the doubler, the laminated skin and the perimeter of the fibre-reinforced supplementary adhesive layer is filled with glue for good bonding to the perimeter of the doubler and the laminated skin. The advantage of using glue in this space between the doubler, the laminated skin and the perimeter of the fibre-reinforced supplementary adhesive layer is that this prevents the doubler becoming detached from the laminated skin at the perimeter. This is in contrast to the situation in which the fibre-reinforced supplementary adhesive layer extends to or beyond the perimeter of the doubler and wherein the fibre-reinforced supplementary adhesive layer between the doubler and the laminated skin may become detached from the laminated skin.

The panel may further comprise a further laminated doubler, wherein said further doubler has a smaller size of perimeter than the skin and/or the laminated doubler and is bonded to an outermost layer of metal of the laminated doubler by a fibre-reinforced supplementary adhesive layer, wherein at least one part of the perimeter of the fibre-reinforced supplementary adhesive layer is staggered inwards relative to the corresponding perimeter of the further doubler and wherein that part of the inwards-staggered perimeter of the fibre-reinforced supplementary adhesive layer is delimited by a glued edge.

With such a panel, several doublers are used for strengthening. This may be advantageous when several doublers are necessary for the desired strengthening, in other words when a single doubler does not provide the desired strengthening of the panel.

According to an embodiment, the glued edge may extend to, or beyond, said corresponding perimeter of the doubler. When the glued edge extends beyond the doubler, an end face of an end edge of the doubler may be embedded in the glue, so that the fibres of the fibre-reinforced adhesive layer of the doubler cannot protrude from the end face.

The panel may further comprise a first part of the perimeter of the doubler bordering on and coinciding with a part of an edge of the skin, with a second part of the perimeter of the doubler located at a distance from the edge of the skin, wherein the supplementary adhesive layer extends to the first part of the perimeter of the doubler and wherein the supplementary adhesive layer is staggered inwards relative to the second part of the perimeter of the doubler.

When the edge parts of the laminated skin and the doubler coincide, detachment of the adhesive layer from the laminated skin does not occur. For this reason, at the location of such coinciding of these edge parts, the supplementary adhesive layer may extend to the edge part of the skin, and therefore to the perimeter of the doubler. Coinciding of the laminated skin and the doubler may arise through material-removal machining of the panel. As a result, the coinciding edge parts of the skin and the doubler are perfectly aligned with each other. A glued edge as described above is not then necessary.

Preferably the glued edge is located exclusively at the location of the inwards-staggered part of the supplementary adhesive layer on the second part of the perimeter of the doubler, which is at a distance from an edge of the skin.

The invention further relates to an aircraft comprising a panel as described above.

The invention will be explained further hereunder, on the basis of the figures.

DETAILED DESCRIPTION

Figure 1:
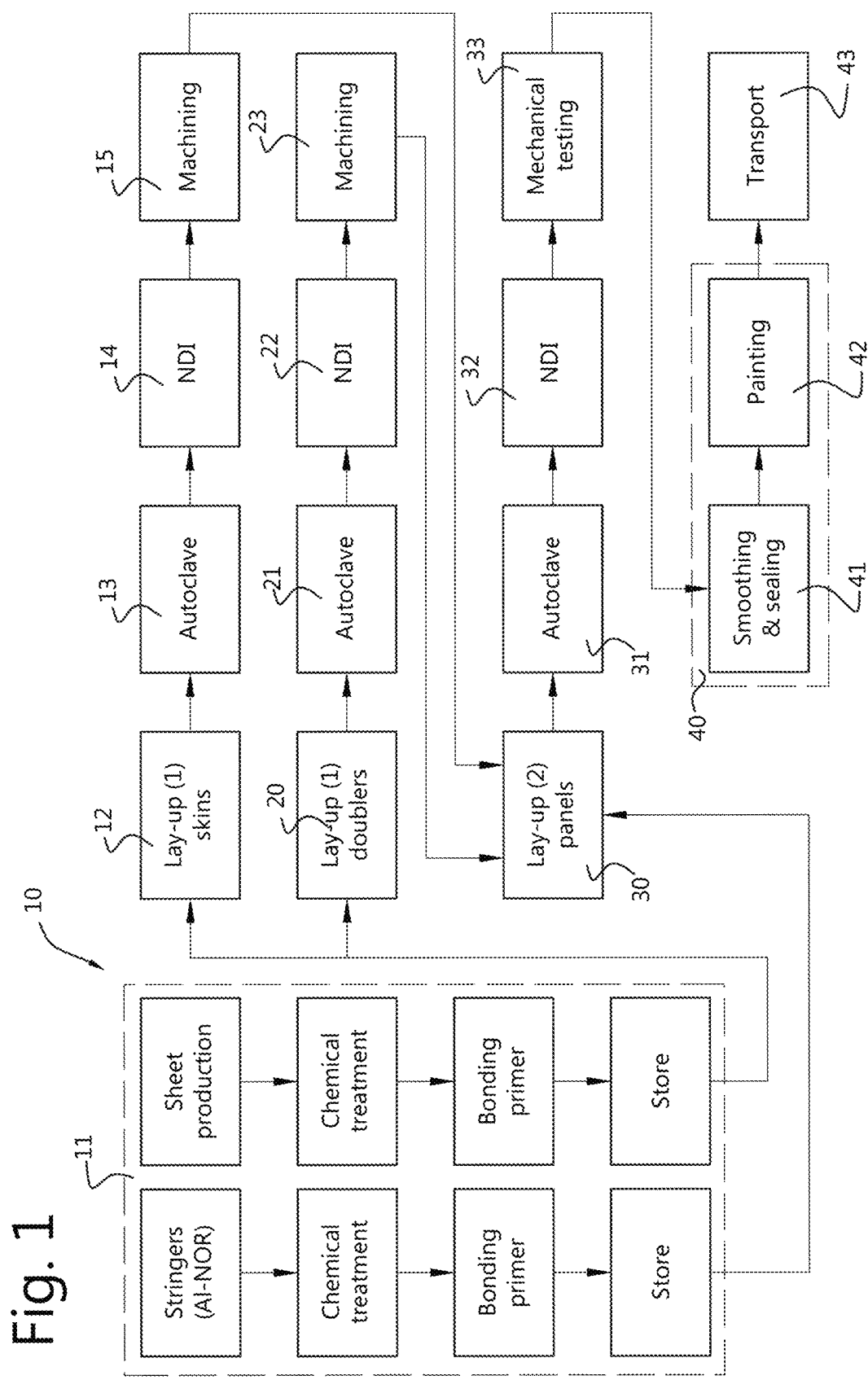
FIG. 1 shows a block diagram of the manufacturing process for a panel with doubler according to the prior art.
Figure 2:
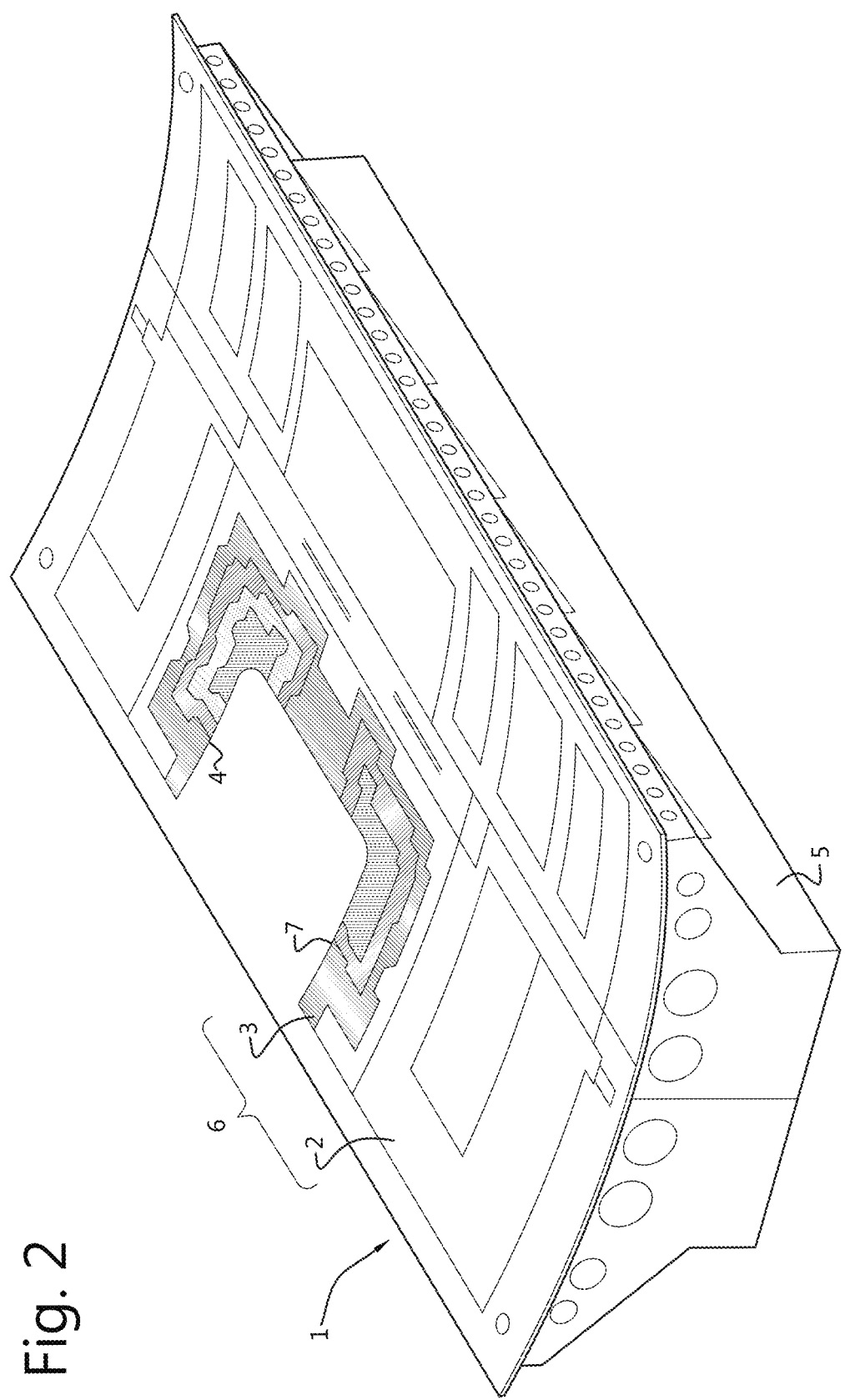
FIG. 2 shows a stack of laminates on a jig during manufacture according to the prior art.

FIG. 1 shows, in a block diagram 10, the manufacturing process for a panel 1, see FIG. 2, according to the prior art. FIG. 2 shows a stack 6 of laminates 2, 3 on a jig 5 during manufacture of a panel 1 according to the prior art from FIG. 1. The manufacturing process starts with the preparation 11 of the various components of the final panel 1. These components comprise the layers of metal and the layers of fibres embedded in a precursor of an adhesive that make up the laminated skin 2 and the doubler 3 of the panel 1. After the preparatory steps 11, the respective layers for forming the laminated skin 2 and for forming the doubler 3 are stacked on one another (steps 12 and 20). During stacking for both components, the layers of metal and the layers of fibres are stacked on one another in such a way that in each case at least one layer of fibres embedded in a precursor of an adhesive is included between two layers of metal.

The stack for forming the skin is put in an autoclave (13), in which, under the effect of pressure and heat, the precursor of the adhesive in the layers of fibres is activated and the layers of metal and the layers of fibres are bonded together so that a laminated skin is produced. The formed skin 2 undergoes non-destructive inspection, for example by detecting inclusions of air, to check whether the skin meets the quality requirements (14). If the inspection is passed, the laminated skin undergoes material-removal machining (15), for example to make a precursor of a door opening and/or window opening 4.

The stack for forming the doubler 3 is also put in an autoclave (21), in which, under the effect of pressure and heat, the precursor of the adhesive in the layers of fibres is activated and the layers of metal and the layers of fibres are bonded together so that the laminated doubler is produced. The formed doubler 3 undergoes non-destructive inspection, for example by detecting inclusions of air, to check whether the laminate meets the quality requirements (22). If the inspection is passed, the doubler undergoes material-removal machining (23), for example to make a precursor 7 of the final form of the doubler, and to bring the further edges of the laminated skin to size.

After separate manufacture of the laminated skin 2 and the doubler 3, the doubler 3 is stacked on the laminated skin 2 (30). A further layer of fibres embedded in a precursor of an adhesive is placed between the doubler 3 and the laminated skin 2. This third stack is put in an autoclave (31), in which, under the effect of pressure and heat, the precursor of the adhesive in the further layer of fibres is activated and the laminated skin and the doubler are bonded together so that the panel 1 is produced. The formed panel 1 undergoes non-destructive inspection, for example by detecting inclusions of air, to check whether the panel meets the quality requirements (32). If the inspection is passed, the panel undergoes mechanical testing (33).

After this material-removal machining, the panel undergoes finishing (40), including levelling of the surface and closing of various openings and cavities in the panel (41). Before the panel can be transported (43) to the assembly station, the panel is provided with a coat of paint (42).

Figure 3:
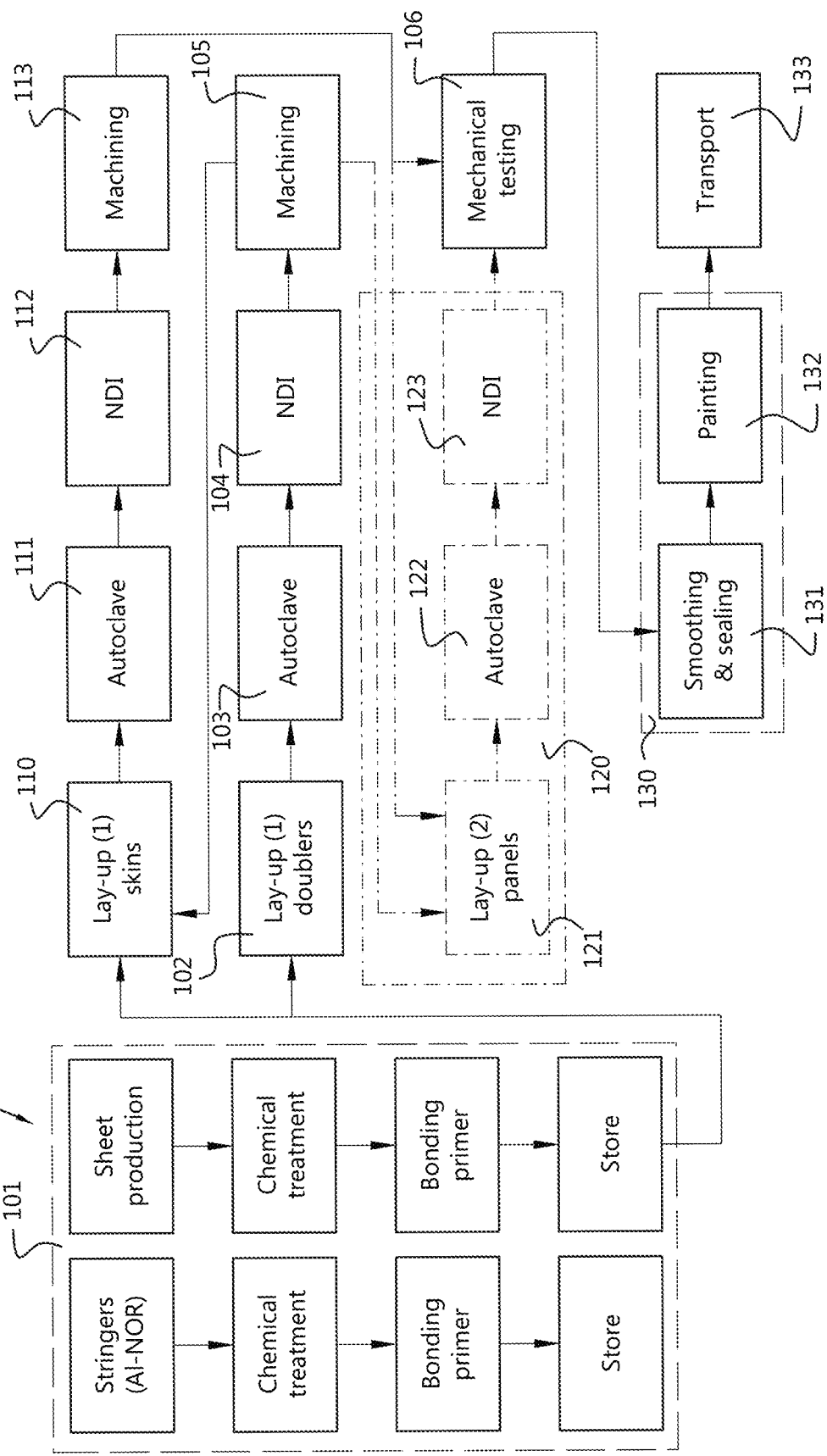
FIG. 3 shows a block diagram of the manufacturing process for a panel with doubler according to the invention.
Figure 4:
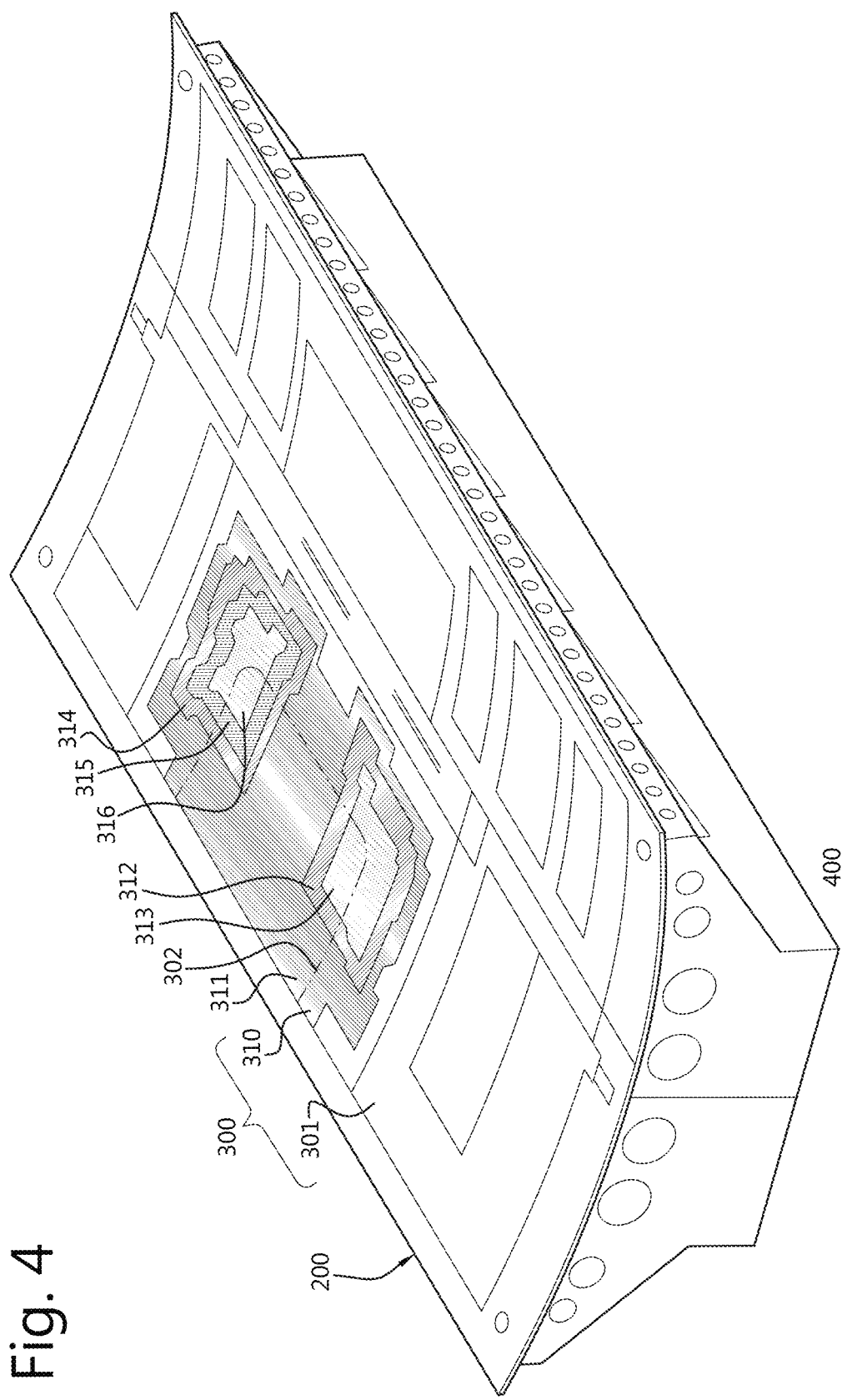
FIG. 4 shows a stack of layers on a jig during manufacture according to the invention.

FIG. 3 shows a block diagram 100 of the manufacturing process for a panel 200 with doubler 310 according to the invention. FIG. 4 shows a stack 300 of layers on a jig 400 during manufacture of the panel 200 according to the invention. The manufacturing process again starts with preparation 101 of the various components of the final panel 200. These components comprise the layers of metal and the layers of fibres embedded in a precursor of an adhesive that make up the laminated skin 301 and the doubler 310 of the panel 200. After the preparatory steps 101, first the layers for forming the doubler 310 are stacked on one another (step 102). During stacking of the layers for the doubler 310, the layers of metal and the layers of fibres are stacked on one another in such a way that in each case at least one layer of fibres embedded in a precursor of an adhesive is included between two layers of metal.

The stack for forming the doubler 310 is put in an autoclave (103), in which, under the effect of pressure and heat, the precursor of the adhesive in the layers of fibres is activated and the layers of metal and the layers of fibres are bonded together so that the laminated doubler 310 is produced. The formed doubler 310 undergoes non-destructive inspection, for example by detecting inclusions of air, to check whether the laminate meets the quality requirements (104). If the inspection is passed, the doubler undergoes material-removal machining (105), for example to make a precursor of the final form of the doubler. The doubler 310 is to be understood as the doubler shown 311 and the further doublers 312, 313, 314, 315, 316. These various doublers 311-316 form the complete doubler 310. At least one layer of fibres embedded in a precursor of an adhesive is placed in each case between two doublers 311-316, to form a supplementary adhesive layer between the doublers after activation.

Then the layers for forming the laminated skin 301 are stacked on one another (110). During stacking of the layers for forming the skin 301, the layers of metal and the layers of fibres are stacked on one another in such a way that in each case at least one layer of fibres embedded in a precursor of an adhesive is included between two layers of metal. A further layer of fibres embedded in a precursor of an adhesive is placed on the stack of the layers for the skin 301 (see FIG. 5). Then the doubler 310 is placed on this further layer of fibres, so that the further layer of fibres forms an intermediate layer between the stack and the doubler 310.

The stack for forming the skin 301, the intermediate layer and the doubler 310 is put in an autoclave (111), in which, under the effect of pressure and heat, the precursor of the adhesive in the layers of fibres is activated and the layers of metal and the layers of fibres of the stack are bonded together so that a laminated skin 301 is produced. Furthermore, the precursor of the adhesive in the intermediate layer is activated so that the doubler is bonded to an outermost layer of metal of the laminated skin and the panel 200 is formed. The formed panel 200 undergoes non-destructive inspection, for example by detecting inclusions of air, to check whether the panel 1 meets the quality requirements (112). If the inspection is passed, the laminated skin undergoes material-removal machining (113) to obtain the final form of the panel.

After this material-removal machining, the panel undergoes mechanical testing (106) and then finishing (130), including levelling of the surface and closing of various openings and cavities in the panel (131). Before the panel can be transported (133) to the assembly station, the panel is provided with a coat of paint (132).

As shown in FIG. 3, steps 121, 122, 123 under block 120 are omitted. This means that in the manufacturing process according to the invention, compared to that according to the prior art from FIG. 1, at least one stacking step 121, an autoclave step 122 and an inspection step 123 are omitted.

Figure 5:
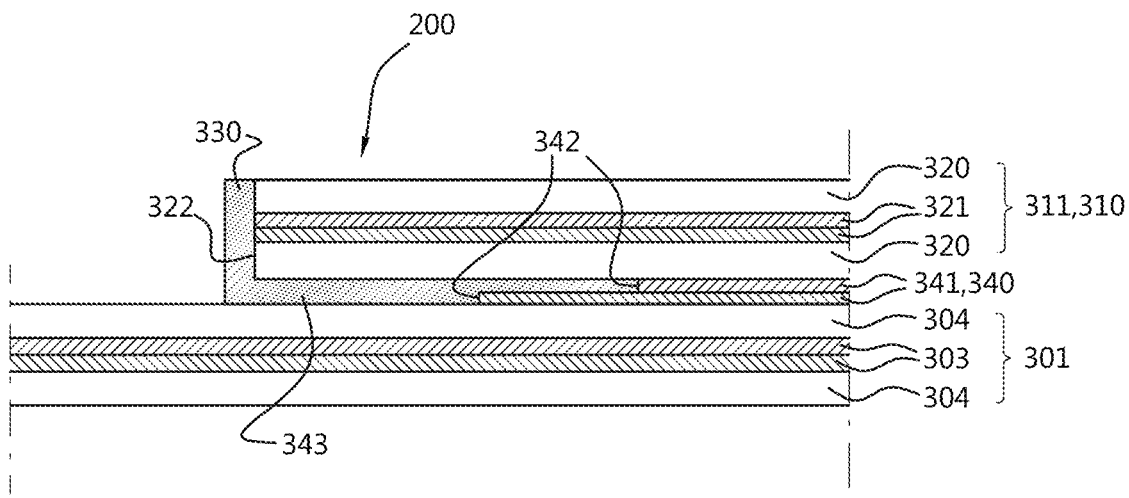
FIG. 5 shows a cross-section of a panel provided with a doubler according to the invention.

FIG. 5 shows a cross-section of the panel 200 provided with the doubler 310 according to the invention. The complete doubler 310 consists of a single doubler 311. The doubler 311 comprises two layers of metal 320 between which there are two fibre-reinforced adhesive layers 321. The doubler 311 is provided on a laminated skin 301 that is formed from two layers of metal 304 with two fibre-reinforced adhesive layers 303 between them. The doubler 311 is bonded to the laminated skin 301 by means of the supplementary adhesive layer 340. This supplementary adhesive layer 340 consists of two fibre-reinforced intermediate adhesive layers 341. As shown in FIG. 5, the final perimeter 342 of the intermediate layers 341 is set back from the perimeter 322 of the doubler 311. The space 343 that is thus created between the doubler 311 and the laminated skin 301 is filled with a layer of glue 330. This layer of glue 330 prevents the doubler 311 becoming detached at the perimeter 322 from the laminated skin 301 through detachment of the supplementary adhesive layer 340 from the laminated skin 301. The layer of glue 330 extends beyond the perimeter 322 of the doubler 311 and covers it on the full thickness.

Figure 6:
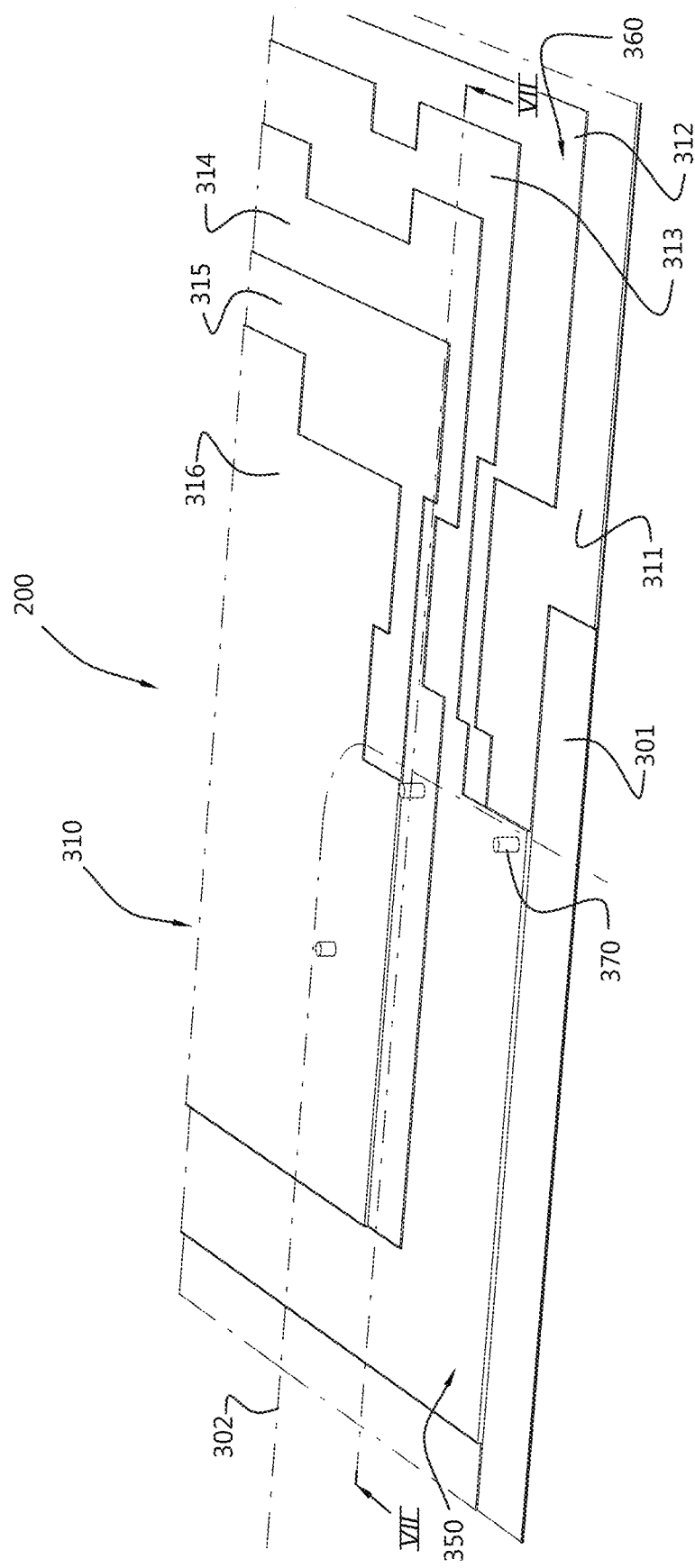
FIG. 6 shows a perspective view of the inside of a panel provided with several doublers, such as for an aircraft fuselage, according to the invention.

FIG. 6 shows a perspective view of the inside of a panel 200 provided with a doubler 310 comprising several strengthening layers 311-316, such as for an aircraft fuselage, according to the invention. After manufacture of the panel 200 in the autoclave, the doubler 310 does not yet have the final form for assembly. After manufacture, the panel 200 comprises two parts 350, 360. A first part 350 is provided with positioning openings 370 (shown in FIG. 7 and shown schematically in FIG. 6), which for manufacturing the panel 200 are provided in the layers of the stack for forming the laminated skin and in the one or more doublers 311-316 that form the doubler 310. Positioning pins 380 are provided in the jig 400, see FIG. 7, which are included in the positioning openings 370 of the various components during stacking in the jig 400. The interaction between the positioning pins 380 and the positioning openings 370 provides good mutual alignment or positioning of the layers 304, 303 in the stack and of the stack with the doubler 310. After manufacture of the panel 200, the first part 350, provided with the positioning openings, will be removed by material-removal machining from the second part 360. This second part 360 of the panel 200 then forms the panel ready for assembly.

Figure 7:
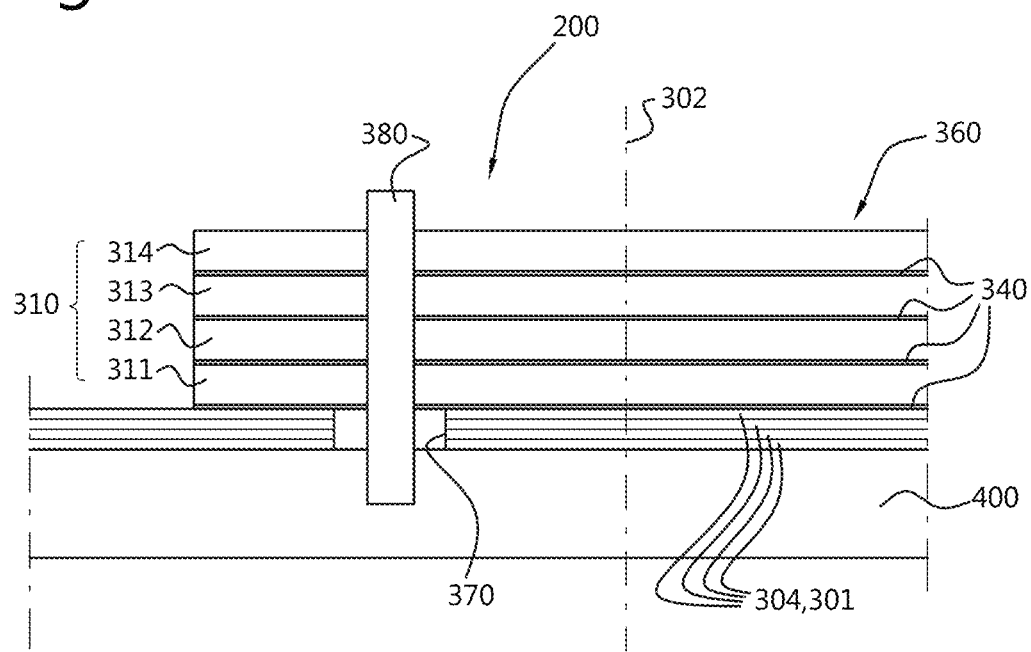
FIG. 7 shows a cross-section of the panel according to FIG. 6.

FIG. 7 shows a cross-section of the panel according to line VII-VII in FIG. 6. The cross-section shows the panel 200 placed on the jig 400, wherein the jig 400 is provided with a positioning pin 380. The laminated skin 301, consisting of layers of metal 304 with a fibre-reinforced adhesive layer (not shown) in each case between two layers of metal, is provided with a positioning opening 370, into which the positioning pin 380 of the jig 400 fits. The complete doubler 310 comprises several doublers 311-314. In each case between two doublers 311-314, a supplementary adhesive layer 340 is provided for bonding between two doublers. Furthermore, a supplementary adhesive layer 340 of this kind is provided between the complete doubler and the laminated skin 301.

The complete doubler is provided with a positioning opening 370 for receiving the positioning pin 380. This ensures that the complete doubler and the layers of the laminated skin 301 are aligned relative to one another. The positioning openings 370 are provided in the first part 350 of the panel 200, which after machining is removed from the second part 360 along the machining line 302. The second part 360 of the panel 200 then forms the panel ready for assembly.

The invention claimed is:

1. Method for manufacturing a panel for an aircraft structure, said panel being provided with a doubler, wherein the method comprises:

supplying the doubler, which doubler is a laminate of layers comprising at least two layers of metal and at least one fibre-reinforced adhesive layer between each two adjacent layers of metal in the laminate, and by means of said at least one fibre-reinforced adhesive layer the at least two layers of metal are fastened together, supplying a jig, supplying, in the jig, a stack of layers of metal and layers of fibres embedded in a precursor of an adhesive included between each two adjacent layers of metal to form a skin, placing a further layer of fibres embedded in a precursor of an adhesive on the stack, placing the doubler on the further layer of fibres embedded in a precursor of an adhesive, so that the further layer of fibres embedded in a precursor of an adhesive forms an intermediate layer between the stack of layers of metal and the doubler, placing an air-tight covering layer over the stack, the intermediate layer and the doubler, thereby forming a space between the jig and the covering layer, air-tight closure of the covering layer, around a perimeter of the stack of layers of metal, the intermediate layer and the doubler, with respect to the jig, thereby forming a sealed covering layer and a space between the jig and said covering layer, putting the jig with the stack, the intermediate layer and the doubler as well as the sealed covering layer in an autoclave, lowering a pressure in the space between the jig and the covering layer, increasing temperature and pressure in the autoclave, causing the adhesive to glue the stack of layers of metal together by activating the precursor of the adhesive of each layer of fibres embedded in a precursor of an adhesive, thereby forming a laminated skin, as well as simultaneously, effected by the increased temperature and pressure in the autoclave, activating the precursor of the adhesive of the further layer of fibres in the intermediate layer with formation of a supplementary adhesive layer, by means of which the doubler is bonded to the laminated skin, thereby forming the panel, removing the panel from the autoclave.

2. Method according to claim 1, comprising the steps of:

causing a perimeter of a further layer of fibres to recede relative to a perimeter of the doubler, filling a space delimited by the doubler, the stack and the perimeter of the further layer of fibres with glue, forming a glued edge, activating the glued edge under the effect of heat in the autoclave.

3. Method according to claim 1, comprising the step of:
after removal of the panel from the autoclave, simultaneous material-removal machining of a combined edge part of the laminated skin and the doubler of the panel to provide a predetermined nominal edge shape and dimensioning of the panel.

4. Method according to claim 3, further comprising:
providing positioning openings in the doubler,
providing positioning openings in the layers of metal and layer of fibres embedded in a precursor of an adhesive for forming the laminated skin,
in the jig, aligning said positioning openings in the doubler and in the skin relative to one another,
fastening positioning pins to the jig that extend through said positioning openings in the doubler and in the layers for forming the laminated skin.

5. Method according to claim 4, further comprising:
manufacturing a doubler and a skin with oversize with formation of a supplementary region into which both the skin and the doubler extend,
providing the positioning openings through the skin and the doubler of the panel in a location of the supplementary region,
removing the supplementary region with formation of an edge of the panel.

6. Method according to claim 1, comprising manufacturing the doubler by the steps of:
supplying a supplementary jig,
supplying, in the supplementary jig, a supplementary stack of layers of metal and layers of fibres embedded in a precursor of an adhesive included between each two adjacent layers of metal,
placing an air-tight covering layer over the supplementary stack, thereby forming a space between the supplementary jig and the covering layer,
air-tight closure of the covering layer around a perimeter of the supplementary stack relative to the supplementary jig,
putting the supplementary jig with the supplementary stack in an autoclave,
lowering the pressure in the space between the supplementary jig and the covering layer,
increasing temperature and pressure in the autoclave, causing the adhesive to glue the layers of metal together by activating the precursor of the adhesive of each layer of fibres, with formation of a doubler, which doubler is a laminate of layers comprising at least two layers of metal and at least one fibre-reinforced adhesive layer between each two adjacent layers of metal,
removing the doubler from the autoclave.

7. Method according to claim 1, wherein supplying the doubler comprises manufacturing the doubler by the steps of:
supplying a supplementary stack of layers of metal and layers of fibres embedded in a precursor of an adhesive included between each two adjacent layers of metal, and
placing the supplementary stack on the intermediate layer, wherein during the step of increasing temperature and pressure in the autoclave, causing the adhesive to glue the layers of metal together by activating the precursor of the adhesive of each layer of fibres, a doubler is formed as a laminate of layers of metal and at least one fibre-reinforced adhesive layer between each two adjacent layers of metal on the laminated skin.

8. Method according to claim 7, wherein each layer of metal of the supplementary stack has a smaller perimeter than an underlying layer of metal of the supplementary stack.

9. Method according to claim 1, comprising applying a doubler that has a smaller perimeter than the skin.

10. Method according to claim 1, comprising, before placing an air-tight covering layer over the stack, the intermediate layer and the doubler, the step of placing a further intermediate layer on a free side of the doubler, wherein the further intermediate layer comprises a further layer of fibres embedded in a precursor of an adhesive, and placing a further doubler on the further intermediate layer.

11. Method according to claim 2, comprising the step of:
after removal of the panel from the autoclave, simultaneous material-removal machining of a combined edge part of the laminated skin and the doubler of the panel to provide a predetermined nominal edge shape and dimensioning of the panel.

12. Method according to claim 1, further comprising:
providing positioning openings in the doubler,
providing positioning openings in the layers of metal and embedded layers of fibres for forming the skin,
in the jig, aligning said positioning openings in the doubler and in the skin relative to one another,
fastening positioning pins to the jig that extend through said positioning openings in the doubler and in the skin.

13. Method according to claim 2, further comprising:
providing positioning openings in the doubler,
providing positioning openings in the layers of metal and embedded layers of fibres for forming the skin,
in the jig, aligning said positioning openings in the doubler and in the skin relative to one another,
fastening positioning pins to the jig that extend through said positioning openings in the doubler and in the skin.

14. Method according to claim 2, comprising manufacturing the doubler by the steps of:
supplying a supplementary jig,
supplying, in the supplementary jig, a supplementary stack of layers of metal and layers of fibres embedded in a precursor of an adhesive included between each two adjacent layers of metal,
placing an air-tight covering layer over the supplementary stack, thereby forming a space between the supplementary jig and the covering layer, thereby forming a space between the supplementary jig said covering layer,
air-tight closure of the covering layer around a perimeter of the supplementary stack relative to the supplementary jig,
putting the supplementary jig with the supplementary stack in an autoclave,
lowering the pressure in the space between the supplementary jig and the covering layer,
increasing temperature and pressure in the autoclave, causing the adhesive to glue the layers of metal together by activating the precursor of the adhesive of each layer of fibres, with formation of a doubler, which doubler is a laminate of layers comprising at least two layers of metal and at least one fibre-reinforced adhesive layer between each two adjacent layers of metal,
removing the doubler from the autoclave.

* * * * *